United States Patent [19]

Fan

[11] Patent Number: 5,021,277

[45] Date of Patent: Jun. 4, 1991

[54] AUTOMOBILE MAT

[76] Inventor: Sung-Hsing Fan, No. 236, Sec. 1, Ta-Tung Rd., Tainan City, Taiwan

[21] Appl. No.: 407,559

[22] Filed: Sep. 15, 1989

[51] Int. Cl.$^5$ .......................... B32B 3/10; B32B 1/06
[52] U.S. Cl. .................................. 428/76; 428/102; 428/192; 428/138; 296/97.23; 15/215; 15/216
[58] Field of Search ................ 428/102, 192, 138, 76; 15/215, 216; 296/97.23

Primary Examiner—Alexander S. Thomas
Attorney, Agent, or Firm—Marshall & Melhorn

[57] ABSTRACT

An automobile mat includes an upper layer a lower layer as well as a middle layer sandwiched between the upper layer and the lower layer. The upper layer and the middle layer are respectively provided with a plurality of holes. A plurality of spacing members are provided between the middle layer and the lower layer for spacing the middle layer from the lower layer. Therefore, the sand attached to an automobile occupant's shoes can be brushed off so as to pass through the holes of the upper and middle layers and be collected in a cavity formed between the middle layer and the lower layer.

6 Claims, 4 Drawing Sheets

AUTOMOBILE MAT

BACKGROUND OF THE INVENTION

This invention relates to an automobile mat, and more particularly to a three-layer automobile mat which can collect the sand and dirt from the shoes of the automobile's occupants.

Referring to FIG. 1, a conventional automobile mat includes a layer of rubber 1 and a layer of pile fabric 2 attached to the upper side of the layer of rubber 1. A plurality of intersecting ribs are provided at the bottom side of the rubber layer 1 so as to increase the friction between the automobile mat and the floor of an automobile on which the automobile mat is to be placed. A plastic strip 3 is sewn along the peripheries of the rubber layer 1 and the pile fabric layer 2 to bind said rubber layer 1 and said pile fabric layer 2 together. The sand, dirt, etc., attached to the automobile occupant's shoes, will be tracked into the car and accumulated on the pile fabric layer 2 during the use of the mat. However, the sand etc., on the automobile mat is usually scattered about the floor of an automobile due to the slippage of said automobile mat. Another type of conventional automobile mat, which is a plastic plate having a plurality of plastic piles attached thereon, is used to brush off the sand attached to the occupant's shoes. However, such a conventional automobile mat also cannot collect said sand, resulting in the frequent scattering of said sands from the automobile mat onto the car floor during use.

SUMMARY OF THE INVENTION

It is therefore a main object of this invention to provide an automobile mat which can collect the sand etc., attached to an automobile occupant's shoes and prevent said sand from being scattered about the automobile floor.

Accordingly, an automobile mat of the present invention includes an upper layer having a plurality of holes formed therein; a lower layer having a opening formed therein and means for closing the opening; a middle layer sandwiched between the upper and lower layers, the middle layer having a plurality of holes formed therein; means for binding the peripheries of the upper, lower and middle layers; and a means for spacing the middle layer and the lower layer which is provided between said middle layer and said lower layer. Whereby, the sand on an automobile occupant's shoes can drop and pass through the holes of the upper and the middle layers and be collected in a cavity formed between the middle layer and the lower layer so as to prevent said sand from being scattered from the automobile mat onto the automobile floor. In addition, the collected sand can be conveniently removed via the opening of the lower layer.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
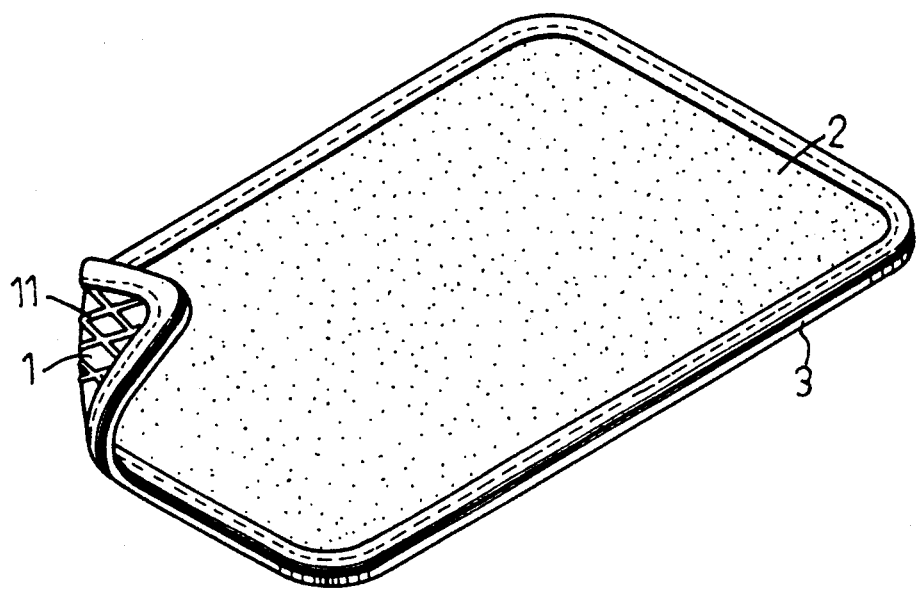
FIG. 1 is a perspective view of a conventional automobile mat.
Figure 3:
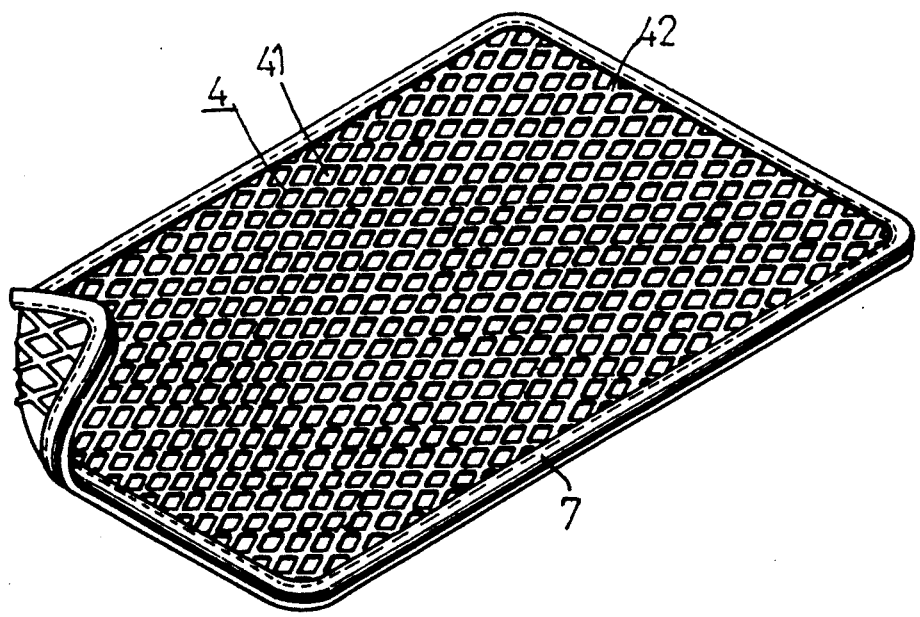
FIG. 3 is a perspective exploded view of a preferred embodiment of an automobile mat of this invention.
Figure 2:
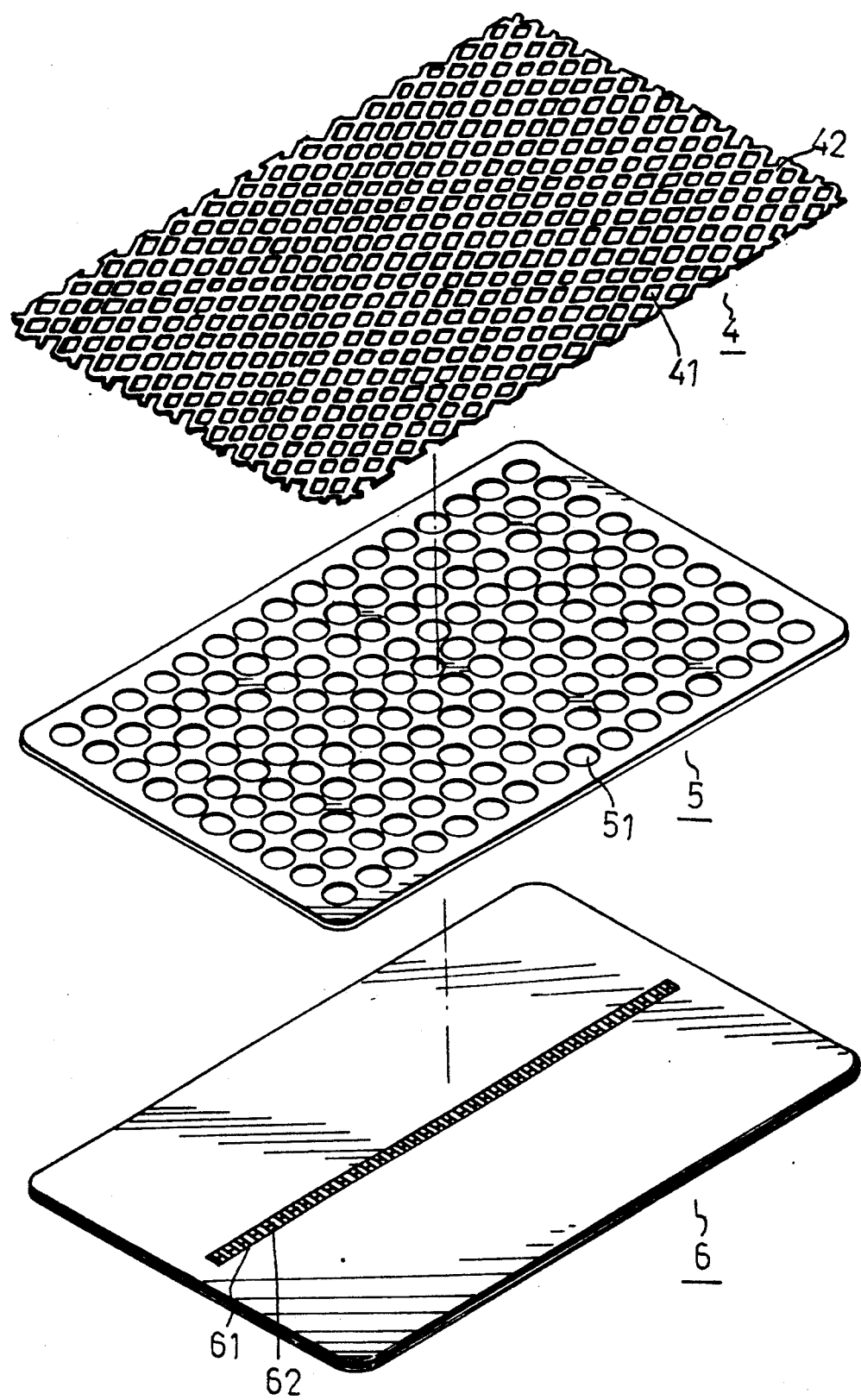
FIG. 2 is a perspective view of a preferred embodiment of an automobile mat of this invention.

Referring to FIGS. 2, 3, an automobile mat generally includes an upper layer 4, a middle layer 5 and a lower layer 6.

Figure 6:
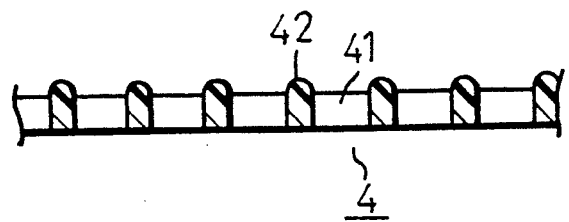
FIG. 6 is a section view of the upper layer of the automobile mat of FIG. 3 according to this invention.

The latticed upper layer 4 has a thickness of 2 mm and is made of nonwoven fabrics. In addition, a plastic material may be used to manufacture the upper layer 4. A plurality of holes 41 are formed among a plurality of intersecting ribs 42. Preferably, the ribs 42 of the upper layer 4 have rounded faces on the upper side of the upper layer 4, as best illustrated in FIG. 6. In this way, the sand on an automobile occupant's shoes can collect in the automobile mat of this invention by sliding down through the holes 41 in the upper layer 4 thereof, without any accumulation of said sand on the ribs 42.

Figure 5:
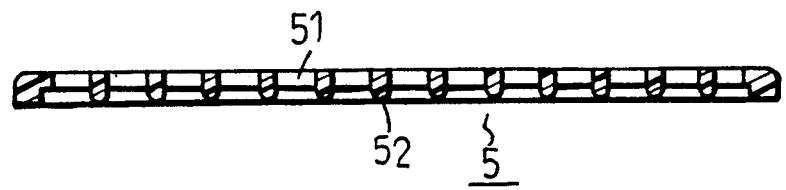
FIG. 5 is a sectional view of the middle layer of the automobile mat of FIG. 3 according to this invention.

The middle layer 5 is made of a flexible foam material which has a thickness of 3 to 5 mm. A plurality of circular holes 51 are evenly formed in the middle layer 5. The size of each of said holes 51 of the middle layer 5 is greater than that of each of the holes 41 of the upper layer 4. At the bottom side of the middle layer 5, a plurality of projections 52 which are provided among said holes 51, as best illustrated in FIG. 5. Thereby, the middle layer 5 is spaced from the lower layer 6 so as to form a cavity for receiving the collected sand.

Figure 4:
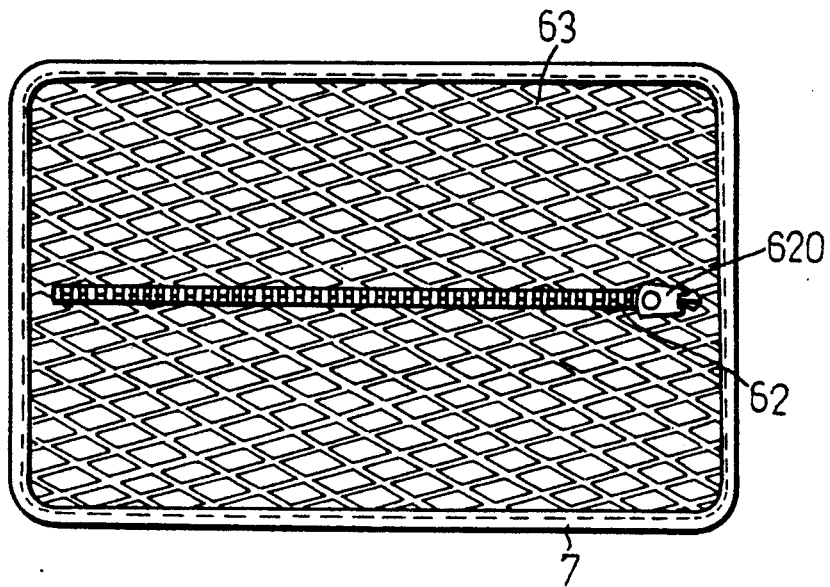
FIG. 4 is an elevated view of the bottom side of the automobile mat of this invention.

The lower layer 6 is formed of a flexible plastic material which has a thickness of 3 mm. An elongated opening 61 is formed in the lower layer 6 which is closed by a zipper 62. Referring to FIG. 4, the bottom side of the lower layer 6 is provided with a plurality of intersecting ribs 63 so as to increase the friction between the automobile mat and the floor of the automobile on which the automobile mat is placed. A zipper pull 620 is provided on the bottom side of the lower layer 6. In assembly, the upper layer 4 is adhered to the middle layer 5 and then a plastic strip 7 is sewn to the peripheries of the upper, middle and lower layers 4, 5, 6 so as to bind said upper, middle and lower layers 4, 5, 6 together.

Figure 7:
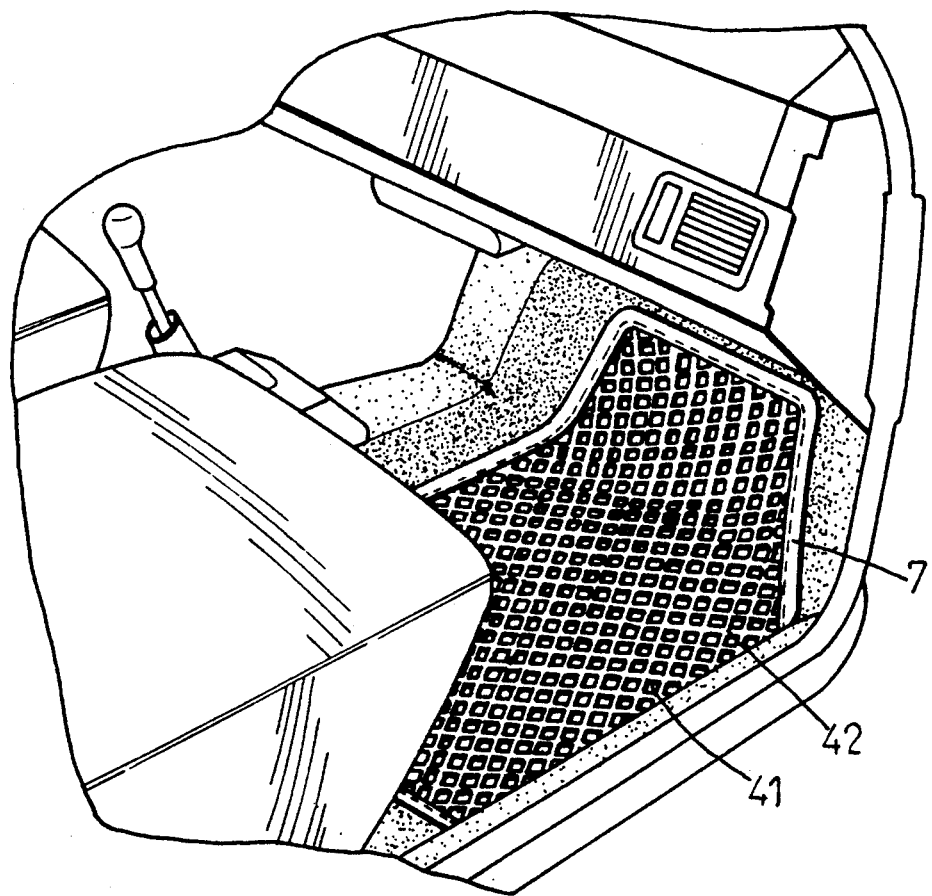
FIG. 7 is a schematic view showing the automatic mat of this invention mounted to the floor of an automobile.

An automobile mat of this invention may be mounted to the floor of an automobile, as best illustrated in FIG. 7. By using such an automobile mat, the sand, etc., attached to an automobile occupant's shoes passes through the holes 41 of the upper layer 4 and the holes 51 of the middle layer 5 and then accumulates on the lower layer 6. In this way, said sand etc., can be collected in the said automobile mat and prevent from scattering when said automobile mat accidentally moves on the floor of an automobile. Said sand etc., can be removed from the opening 61 in the lower layer 6 by unlocking the zipper 62 thereof.

With this invention thus explained, it is apparent that numerous modifications and variations can be made without departing from the scope and spirit of this invention. It is therefore intended that this invention be limited only as indicated in the appended claims.

I claim:

1. An automobile mat comprising:
   an upper layer with a first periphery, having a plurality of holes formed therein;
   a lower layer with a second periphery having a opening formed therein and means for closing said opening;
   a middle layer with a third periphery sandwiched between said upper and lower layers, said middle layer having a plurality of holes formed therein;
   means for binding said first, second and third peripheries of said upper, lower and middle layers; and
   means for spacing said middle layer and lower layer which is provided between said middle layer and lower layer.

2. An automobile mat as claimed in claim 1, wherein said binding means is a plastic strip surrounding said first, second and third peripheries of said upper, lower and middle layers and sewn thereonto.

3. An automobile mat as claimed in claim 1, wherein said spacing means comprises a plurality of protrusions formed on a bottom surface of said middle layer facing said lower layer.

4. An automobile mat as claimed in claim 1, wherein said upper layer includes a plurality of intersecting ribs, said intersecting ribs having rounded faces formed at an upper side of said upper layer remote from said middle layer.

5. An automobile mat as claimed in claim 1, wherein said closing means is a zipper provided along said opening of said lower layer.

6. An automobile mat as claimed in claim 1, wherein said holes of said upper layer are smaller than said holes of said middle layer.

* * * * *